United States Patent Office 2,997,494
Patented Aug. 22, 1961

2,997,494
METHOD OF PREPARING VINYL ESTERS OF CARBOXYLIC ACIDS
Charles Brown, New York, N.Y., assignor to Air Reduction Company, Incorporated, New York, N.Y., a corporation of New York
No Drawing. Filed Aug. 27, 1956, Ser. No. 606,212
11 Claims. (Cl. 260—410.9)

The present invention relates to a novel method for the preparation of vinyl esters of carboxylic acids by a vinyl interchange or transvinylation reaction between a vinyl ester reactant and a carboxylic acid in the presence of a vinyl interchange catalyst.

Vinyl interchange has been employed previously in the preparation of vinyl esters of aliphatic monocarboxylic acids using vinyl acetate as the vinyl ester reactant, as illustrated by the equation:

$$RCOOH + CH_3COOCH=CH_2 \rightarrow RCOOCH=CH_2 + CH_3COOH$$

The reaction employs a mercury catalyst and a strong acid co-catalyst which form, as the active transvinylation catalyst agent, a mercuric salt of the co-catalyst acid. Generally, the reaction involves heating the reactants in the presence of the catalyst to form the desired vinyl ester product and the corresponding by-product acid of the vinyl ester reactant.

As a result of the method heretofore used for carrying out vinyl interchange reactions, as exemplified, for example, in the Toussaint et al., U.S. Patent No. 2,299,862, and in the Port et al., U.S. Patent No. 2,586,860, the mercury catalyst becomes poisoned, or "inactivated" and cannot be recycled to effect a subsequent or further transvinylation. Such inability to recycle the mercury catalyst has detracted from the practicability of the vinyl interchange process and retarded its commercial development.

The present invention provides an improved method for carrying out vinyl interchange reactions in which it is possible to recover and directly recycle the mercury catalyst, thus enabling more efficient utilization of the mercury catalyst than has been possible by prior methods. In this method the mercury catalyst, or mercury-containing compound of the mercury-acid catalyst, is recovered substantially completely in a form which is at least as active catalytically, when in the presence of the co-catalyst acid, as the fresh mercury catalyst, and in some instances, apparently, even slightly more active. The invention, furthermore, includes a continuous operation in which a series of vinyl interchange reactions are carried out using the mercury catalyst recovered from preceding reactions.

According to this invention, vinyl esters of carboxylic acids are prepared by reacting a vinyl ester reactant with a carboxylic acid, in the presence of a mercury-acid vinyl interchange catalyst, neutralizing the co-catalyst acid to form an insoluble salt thereof, substantially upon completion of the vinyl interchange reaction, separating the insoluble co-catalyst acid salt and obtaining, from the remaining product mixture, the desired vinyl ester product and the mercury catalyst in active form. In a highly advantageous method of carrying out the vinyl interchange reaction according to this invention, the co-catalyst acid is neutralized, substantially upon completion of the vinyl interchange reaction, with a neutralizing agent which is effective to form an insoluble salt of the co-catalyst acid and which is, itself, highly insoluble in the reaction product mixture. After neutralization, the solids present are removed, such as by filtration or other means suitable for solid-liquid phase separation, and the vinyl ester product and mercury catalyst are obtained separately in any convenient manner, as hereinafter more fully described. The mercury catalyst may be recovered advantageously in the residue in which form it is suitable for direct recycling.

Most advantageously, the insoluble substances present after neutralization of the co-catalyst acid are removed prior to further treatment. Alternatively, however, the low boiling product constituents may first be removed, such as by stripping, and the solids resulting from neutralization of the co-catalyst acid then separated. However, which sequence may be employed, these solids are removed from the crude vinyl ester liquid mixture before finally obtaining the mercury catalyst, or catalyst containing residue, in order to prevent contamination of the recovered catalyst.

The neutralizing agents effective for the purpose of this invention comprise basic substances, preferably an alkaline earth metal base, which are capable of forming salts of the co-catalyst acid that are highly insoluble in the reaction mixture and which are themselves, substantially insoluble therein. Substances which may be used include, for example, the oxides and hydroxides of the alkaline earth metals. In addition, the alkaline earth metal salts of weak acids which are insoluble in the reaction product, such as the salts of formic and benzoic acids, also may be used for neutralization. The preferred agents are calcium and barium hydroxide. Calcium oxide and barium oxide are further specific examples of neutralizing agents which can be used. These agents form highly insoluble acid salts which can easily be separated from the reaction product mixture and in which the amount of mercury catalyst and of the product constituents absorbed or carried off therein, and thus lost to recovery from the remaining mixture, is reduced to a minimum. When the neutralizing agent is not highly insoluble in the reaction product, some is retained in the residue and prevents suitable catalytic activity in subsequent recycles.

The neutralization is carried out, advantageously, as soon as possible after substantial completion of the reaction to prevent reversion of the reaction which readily occurs in the presence of the active catalyst when a substantial amount of the by-product acid is present. Neutralization is also important to prevent other undesirable effects which might result from the presence of the active catalyst in the reaction product such as polymerization, decomposition, excessive color formation and the like, during the subsequent removal of the unreacted vinyl ester reactant or by other subsequent treatments.

The neutralization can be accomplished simply by adding the neutralizing agent to the reaction product mixture, and is carried out advantageously at temperatures below the reaction temperature and at a temperature at which the reaction product mixture remains substantially homogeneous. Temperatures of from room temperature to about 60° C., for example, may be used. At these temperatures the neutralizing agents and co-catalyst-acid salts formed thereby are insoluble and readily removed from the reaction mixture by filtration or similar means. For facilitating filtration, it is highly advantageous to employ a filter aid, for example, such as "Hyflo Super Cel," a diatomaceous earth filter aid marketed by Johns-Manville. The amount of the neutralizing agent required corresponds substantially to the amount of acid co-catalyst used in order that all of the acid is effectively neutralized. Considerably larger relative amounts of the neutralizing agent can be used, which tend to facilitate neutralization and shorten the time required. Advantageous results are obtained, for example, by the use of about 4.5 moles of the neutralizer to each mole of catalyst acid. However, excessive adsorption of the recoverable mercury catalyst and some neutralization and consequent loss of unreacted carboxylic acid may occur with too great an excess of the neutralizer. In the preparation of long chain fatty acid vinyl esters such excess particularly, may form soapy residues which interfere with the filtration of the neutralized salts. For the same reason, the time allowed for neutralization should be limited to that sufficient for neutralization of the co-catalyst acid but before any appreciable reaction may occur with unreacted carboxylic acid in the product mixture. Generally effective neutralization may be completed in about one-half hour. It is advantageous to ensure thorough mixing of the neutralizer such as by stirring or agitating the mixture during neutralization. Since the neutralizing agents are, in themselves, insoluble in the reaction product mixture the excess is, of course, removed together with the insoluble salts of the co-catalyst acid.

After separating the insoluble salts and excess neutralizing agents, as hereinabove described, the reaction mixture that is left may contain, in addition to the vinyl ester product and the neutralized mercury catalyst, by-product acid, unreacted vinyl ester reactant and some unreacted carboxylic acid, together with more minor impurities which may include, for example, minor amounts of diesters and possibly some polymerization products. In a highly advantageous manner of operation hereinafter more fully described, most of the by-product acid is removed during the reaction so that the reaction product then contains a relatively small amount thereof. Only a very small amount of the mercury catalyst is lost with the separated solids following neutralization so that substantially all of the mercury catalyst is retained at this point in the remaining product mixture.

Advantageously, the lower boiling constituents comprising the unreacted vinyl ester reactant and its corresponding by-product acid may be separated from the product mixture such as by distillation. The distillation is carried out at temperatures below about 140° C., above which the mercury catalyst may be reduced to metallic mercury and thus lost and reduced pressures may sometimes be employed. Thus, for example, in the case of the removal of vinyl acetate and its corresponding by-product and, acetic acid, temperatures of about 110° C. at still pressures of about 1 mm. have been found suitable. The vinyl ester product then may be separated, in any advantageous manner, leaving a reaction residue containing the recovered, active mercury catalyst. The vinyl ester product, generally, may be separated by distillation and thereby obtained in suitably pure, useful form, or it may be separated by other suitable means such as extraction, by using a suitable solvent. One such method of separation is described, for example, in the application of A. J. Buselli et al., Serial No. 606,496, filed August 27, 1956, now Patent No. 2,949,480 and assigned to the same assignee as the present application, for the preparation of vinyl stearate, wherein a hydrocarbon-solvent extraction method of separation is employed. In further distilling the reaction product to isolate the pure vinyl ester, it is also desirable to avoid the formation of metallic mercury and the consequent loss of the mercury catalyst. Further purification of the separated vinyl ester product as will be known to those skilled in the art may be carried out if desired, such as where a highly pure monomer grade is sought.

It is a significant advantage of the present process that the residue, remaining after the removal of the product constituents as mentioned above, may be recycled directly in a subsequent vinyl interchange reaction without further separating the mercury catalyst from the other residue constituents. These may comprise, for example, primarily some unreacted carboxylic acid and some vinyl ester product which are not completely removed during the normal purification procedure, together with smaller amounts of diester, and possibly some polymerization, by-products, although the latter may be substantially completely eliminated by operating under the preferred reaction conditions. Thus, the components of the residue, resulting from normal work-up procedures, are compatible with the reaction materials used in further vinylation and do not detract from the effectiveness of the recovered mercury catalyst. The mercury catalyst might be further separated from the residue, but there is no practical advantage in doing so.

The method of this invention may be employed in connection with the vinyl interchange of a wide variety of mono-carboxylic or dicarboxylic acid and vinyl ester reactants. Thus, for example, the reaction may be carried out advantageously with monocarboxylic aliphatic acids such as caproic, pelargonic, palmitic and stearic; aliphatic dicarboxylic acids, such as azeleic, adipic and sebacic acids; half-esters of aliphatic dicarboxylic acids, such as methyl acid succinate, and butyl acid succinate; half-esters of aromatic dicarboxylic acids, such as methyl acid phthalate; alicyclic acids, such as cyclohexanoic acid; olefinic acids, such as oleic, and linoleic acids; and aromatic acids, such as benzoic and toluic acids.

Vinyl acetate is especially suitable as the vinyl ester reactant. This material is relatively inexpensive and readily available, and is particularly effective for the purposes of the reaction. Other vinyl esters, however, can be used in place of vinyl acetate, such as vinyl propionate, vinyl butyrate, vinyl valerate, vinyl hexanoate, vinyl heptanoate and the like. Depending upon the vinyl ester reactants employed, an acid corresponding to the acid radical thereof is formed as a by-product.

The mole ratio of the vinyl ester reactant to the carboxylic acid may be varied over a considerably wide range and an excess of the vinyl ester reactant is desirable. With monocarboxylic acids, for example, advantageous results are obtained using about 6 moles of the vinyl ester reactant to one mole of carboxylic acid. In the case of dicarboxylic acids, of course, a substantially greater ratio is used, although slightly less than twice the ratio used for the monocarboxylic acids is sufficient. Generally, a ratio of about 9.4 moles of vinyl ester to one mole of dicarboxylic acid reactant is satisfactory. A greater proportion of the vinyl ester may be used, but there is no apparent advantage in doing so. A lesser proportion might also be used, but when the vinyl ester reactant is reduced below a ratio of about 3 moles to one mole of monocarboxylic acid and below a ratio of about 4.5 moles to one mole of dicarboxylic acid, the yield of the desired vinyl ester is reduced.

As the vinyl interchange catalyst, mercury salt-strong acid catalysts have been found most effective, and particularly mercury salt-sulfuric acid catalysts. Various mercury compounds can be used in conjunction with the acid co-catalysts including, for example, mercuric oxide and mercuric acetate. Other strong acids which may be employed as the co-catalyst include, for example, phosphoric, p-toluene sulfonic and trifluoroacetic acids.

As described above, the mercury catalyst employed is recovered substantially completely from the reaction product and may be recycled directly. However, it is not certain that the recovered mercury compound is of identical composition with the original mercury catalyst since it is believed that other salts or complexes thereof may be formed in the reaction. Thus, it is believed, that at least some of the recovered mercury catalyst may be in the form of a mercury complex of the carboxylic acid reactant. The exact nature of the recovered mercury catalyst, however, is not significant since it is recovered in a form that will catalyze the vinyl interchange reaction when employed with a strong acid, as with the fresh mercury catalyst. The mercury catalysts, or mercury compounds, that are useful herein will therefore be understood to include any of the mercury compounds generally recognized as being useful in a first, or single vinyl interchange reaction, as well as the mercury compounds recovered, in accordance with the present invention, from the reaction product.

The amount of mercury compound or mercury catalyst that can be employed may be varied over a fairly wide range. Generally, about 0.012 mole of the mercury catalyst per mole of monocarboxylic acid is particularly effective. As little as 0.01 mole per mole of monocarboxylic acid also may be used although smaller amounts of the mercury catalyst tend to decrease the speed of the reaction considerably and reduce conversions. The mole to mole ratio given above is substantially constant for each carboxylic group and is about doubled when a dicarboxylic acid reactant is employed. Thus, a ratio of about 0.024 mole of mercury catalyst per mole of dicarboxylic acid is effective. The amount of acid co-catalyst also may be varied considerably. About one-half to one-quarter of the molar equivalent of the mercury catalyst is suitable. Generally, with an excessive amount of the acid co-catalyst, the reaction products become cloudy and rendered more difficult for subsequent purification. A substantial excess may also cause some of the mercury catalyst to be absorbed in the filtered waste residues and thus diminish the amount of the catalyst that can be recovered. Illustrations of suitable amounts of the mercury catalyst and co-catalyst acid that may be used are given in the examples below.

The recovered catalyst is employed in substantially the same manner as above described for the use of the fresh catalyst. Thus, a corresponding amount of the co-catalyst acid and the mercury catalyst are added to the reactants and the subsequent reaction repeated in substantially the same manner. Some of the mercury is lost during purification of the reaction mixture but about 85–90 percent of mercury catalyst may be recovered consistently in each reaction. Assume, for example, that 0.0087 mole (1.9 grams) of mercuric oxide was originally used together with 0.0024 mole (0.13 ml.) of concentrated sulfuric acid giving a molar ratio of 1 to 3.62. With a 10 percent loss of the mercury catalyst in the purification work-up, the residue contains .00783 mole of recovered mercury catalyst. In recycle, the residue, then, would be combined with 0.002163 mole of sulfuric acid to give the same mercury catalyst-sulfuric acid ratio as in the first run. Since the total amount of catalyst is diminished by 10 percent, it is desirable, correspondingly, to reduce the relative amounts of the reactants in the recycle run so that these ratios will be within the limits herein described. Alternatively, where it is preferable to maintain the amounts of the reactants substantially the same in successive runs, the required amount of fresh mercury catalyst may be added as a make-up. In general, the latter is the more expedient procedure, particularly for large-scale production. Thus, in the above illustration, following this procedure, an additional 0.00024 mole (0.19 gms.) of mercuric oxide would be added and the same amount of sulfuric acid employed as in the first run. In recycling the mercury catalyst-containing residue directly, it is possible, taking into account the recovered unreacted carboxylic acid in the residue, to use a correspondingly lesser amount of this reactant during the recycle runs. However, this is usually neglected, since the residue contains such a small amount of this reactant compared to the total.

The reaction temperature may be varied but, generally, should be sufficiently high to afford reasonable reaction rates while at the same time not be so high as to produce excessive polymer formation. It is highly advantageous to carry out the reaction under reflux in most instances. When using vinyl acetate, for example, as a transvinylation agent a reaction temperature of about 75–85° C., which is just below the boiling temperature thereof and corresponds to the reflux temperature for the reaction mixture, is desirable. With some vinyl ester reactants having relatively high boiling temperatures, it may be expedient to employ reduced pressure so that the reaction may be carried out under reflux without going to excessively higher temperatures.

The reaction time, of course, may vary depending upon the temperature employed, the amounts of catalysts used and so forth. Generally, a reaction time of from 2 to 5 hours is sufficient in which to obtain suitable yields.

The course of the interchange reaction may be followed by titrating samples of the reaction mixture and determining the quantity of the by-product acid of the vinyl ester reactant formed, which is in direct proportion to the conversion of the carboxylic acid reactant to the desired vinyl ester product. Under normal equilibrium conditions, about 70–85 percent of the carboxylic acid reactant may be converted. However, it is highly advantageous to carry out the reaction by continuously removing the vinyl ester reactant by-product acid from the reaction mixture in order to shift the reaction in the direction favoring the formation of the vinyl ester product, as described in the application of T. F. Rutledge et al., Serial No. 606,515, filed August 27, 1956, and assigned to the same assignee as the present application. The by-product acid may be removed as described in the above-mentioned application by entrainment which can be accomplished advantageously, for example, by rapidly distilling the vinyl ester reactant from the reaction mixture while simultaneously adding fresh vinyl ester to maintain the correct proportions of the reactants. The vinyl ester vapor is continuously drawn off and carries off therewith, or entrains, the vapor of the by-product acid which is in relatively smaller proportion, corresponding to its partial pressure as compared to that of the vinyl ester reactant. Alternatively, the vinyl ester reactant entraining medium may be first vaporized and passed in vapor form directly through the reaction mixture to carry off the by-product acid vapor. The utilization of the entrainment procedure affords conversions of 90–95 percent as compared to the 70–85 percent equilibrium conversions obtainable by a normal batch-type reaction, and also simplifies the isolation and purification of the crude vinyl ester product.

The following examples illustrate the invention and the manner in which it may be carried out.

In each of the following examples, the process was carried out in a reaction apparatus having two main parts; a reaction flask and a still pot. A one-liter flask fitted with a dropping funnel was used as the still pot to which there was also fitted a U-shaped tube connecting the still pot with a one liter reaction flask equipped with a stirrer. The leg of the U-shaped tube in the reaction flask was arranged so that the end of the tube extended below the level of the reaction mixture. Vinyl acetate, used in each example as the vinyl ester reactant, was vaporized in the still pot, carried through the U-tube; and thence passed through the reaction mixture in order to entrain and remove therefrom the by-product acetic acid formed during the reaction. The reactor was connected to a condenser and a calibrated receiver through a short, wide outlet tube, bent at an angle slightly greater than 90°. Such construction of the outlet tube permitted vinyl acetate vapors to be passed through the reaction mixture and discharged from the reaction flask without reflux so as to facilitate the entrainment of the acid product therein and to assist in its removal from the reaction flask. Both the still pot and the reaction flask were heated. In carrying out each of the examples, samples were periodically taken from the condenser during the reaction, which were mixed with distilled water and immediately titrated with standard NaOH to the phenol phthalein end point to determine the rate and the total amount of acetic acid removed by the entrainment. The reaction was continued until no further carryover of acetic acid to the condenser was apparent.

Prior to each run the reactor apparatus was dried thoroughly by purging with nitrogen and heating.

EXAMPLE I

*"Preparation of vinyl stearate"*

390 ml. of vinyl acetate (4.2 moles) and 2.86 grams mercuric acetate (0.0087 mole) were placed in the reaction flask. To this mixture 0.13 ml. concentrated sulphuric acid (0.0024 mole) was added slowly while stirring. 200 grams (0.71 mole) of T-70 stearic acid (70% stearic acid, 30% palmitic acid) was then added and the reaction mixture heated to the boiling point and stirred for one hour. Vinyl acetate was then distilled from the still pot (at a rate of 500 ml. every 18-19 minutes) through the reaction mixture for 2 hours, 10 minutes. During this time, eight cuts were collected in the condenser and a small sample of each cut was titrated. Flushing and entrainment were continued for 2 hours and 10 minutes after which a total of 40.1 grams of acetic acid had been collected and the rate of acetic acid removed appeared negligible. The mixture was retained at the boiling point for an additional 50 minutes with no further carryover of acetic acid apparent.

0.5 gram calcium hydroxide then was added to the mixture and stirred for one-half hour while continuing the heating to maintain the temperature of the mixture at about 60° C. A dry mat of two grams of a diatomaceous earth filter aid, marketed by Johns-Manville under the trademark of "Filter-Cel" was prepared on a Buchner funnel and the mixture filtered and the residue washed with fresh vinyl acetate.

The clear filtrate was heated by means of an oil bath while simultaneously reducing the condenser pressure until the pressure was reduced to a vacuum of about 1 mm. Hg, which was then maintained. After reduction of the pressure to 1 mm. Hg, heating was continued for 43 minutes until a terminal temperature of 110–111° C. was attained. The remaining crude vinyl stearate weighed 223.1 grams and had an iodine number of 73.0 and an acid number of 9.7.

Vinyl stearate was extracted by adding the crude mixture at room temperature to one liter of cold N-pentane at 0–2° C., in a two-liter flask equipped with a stirrer. After stirring for one hour, the clear liquid was decanted and the residue centrifuged, whereupon the clear liquid was added to the first decant. After stripping the solvent from the decanted clear liquid, a total of 187 grams of pure, monomer-grade vinyl stearate was obtained. The residue weighing 32.9 grams, upon analysis, contained 4.82%, or 1.59 grams, mercury, 45.5% vinyl stearate, 21.6% unreacted stearic acid, and approximately 28% neutrals. The 1.59 grams mercury content of the residue corresponded to 1.76 grams of mercury contained in the 2.8 grams of mercuric acetate originally added, thus representing a recovery of 90.4% of the mercury catalyst in active form. The residue was suitable for recycling.

The following Table I is a tabulation of data for three separate series of five recycle runs, carried out in substantially the same manner as described above, in which the residue containing the recovered mercury catalyst was recycled in each successive run. In these recycles, mercuric oxide was employed as the mercury catalyst in the first run of each series. The same amounts of the reactants were employed in each run and a make-up of 0.29 gram of fresh mercuric oxide, therefore, was added in each successive recycle, corresponding to 15 percent of the original mercury catalyst, which was assumed to be lost during workup. The high conversions and purity of the vinyl stearate product, as given in the tabulated data, illustrate the sustained activity of the recovered and directly recycled catalyst. The vinyl stearate obtained in the runs was a highly active monomer.

TABLE I.—RECYCLE OF MERCURY CATALYST IN PREP. OF VINYL STEARATE BY VINYL INTERCHANGE

| Recycle No. | HgO Added (g.) | Wt. (g.) Recycled Res. | Wt. (g.) Crude VS | Wt. (g.) Residue after Extraction | Purified VS Obtained ||||| 
|---|---|---|---|---|---|---|---|---|---|
| | | | | | Wt. (g.) | I₂ No. | Acid No. | Purity (Percent) | Conversion (Percent) |
| Series I: | | | | | | | | | |
| 0 | 1.9 | | 219.2 | 14.8 | 180.0 | 81.2 | 1.7 | 97.8 | 81.0 |
| 1 | 0.29 | 14.8 | 231.2 | 23.8 | 192 | 79.9 | 5.3 | 96.3 | 85.2 |
| 2 | 0.29 | 23.8 | 240.4 | 25.9 | 197 | 78.4 | 4.1 | 94.4 | 85.8 |
| 3 | 0.29 | 25.9 | 242.9 | 30.3 | 197 | 79.6 | 4.3 | 96.0 | 87.2 |
| 4 | 0.29 | 30.3 | 246.2 | 32.8 | 191.5 | 80.7 | 1.5 | 97.3 | 85.8 |
| 5 | 0.29 | 32.8 | 249.2 | 35.3 | 193.5 | 80.7 | 5.0 | 97.3 | 86.7 |
| Series II: | | | | | | | | | |
| 0 | 1.9 | | 223.2 | 16.3 | 153.0 | 79.6 | 7.9 | 96.0 | |
| 1 | 0.29 | 16.3 | 231.2 | 16.8 | 196.0 | 80.4 | 4.7 | 96.8 | 87.4 |
| 2 | 0.29 | 16.8 | 222.0 | 20.2 | 183.5 | 80.5 | 6.0 | 97.0 | 82.1 |
| 3 | 0.29 | 20.2 | 236.9 | 30.4 | 190.0 | 79.1 | 6.3 | 95.5 | 83.7 |
| 4 | 0.29 | 30.4 | 245.5 | 24.0 | 187.0 | 78.9 | 8.0 | 95.2 | 82.0 |
| 5 | 0.29 | 24.0 | 241.8 | 26.4 | 188.5 | 81.3 | 1.8 | 98.0 | 85.2 |
| Series III: | | | | | | | | | |
| 0 | 1.9 | | 218.1 | 16.4 | 180.5 | 80.1 | 1.9 | 96.5 | 80.3 |
| 1 | 0.29 | 16.4 | 238.3 | 20.1 | 196.5 | 80.6 | 4.4 | 97.2 | 88.2 |
| 2 | 0.29 | 20.1 | 231.6 | 13.7 | 197.0 | 76.9 | 8.5 | 92.5 | 84.0 |
| 3 | 0.29 | 13.7 | 227.9 | 28.7 | 183.0 | 78.8 | 5.1 | 95.0 | 80.0 |
| 4 | 0.29 | 28.7 | 246.6 | 32.9 | 190.5 | 78.5 | 3.1 | 94.7 | 83.2 |
| 5 | 0.29 | 32.9 | 251.5 | 38.8 | 184.0 | 81.7 | 1.9 | 98.5 | 83.5 |

EXAMPLE II

*Divinyl sebacate*

390 ml. (4.2 moles) of vinyl acetate and 1.4 g. (0.0044 mole) of mercuric acetate were placed in the reaction flask. The mixture was rapidly stirred and 0.07 ml. (0.0012 mole) of sulfuric acid was added to the mixture while stirring, one drop at a time. 70.7 g. (0.35 mole) of sebacic acid was then added to the reaction vessel. The reaction mixture was then refluxed gently for 2 hours. At the end of the 2 hours, vinyl acetate was distilled from a separate still pot and the vinyl acetate vapor passed through the reaction mixture at such a rate that 500 ml. of distillate was collected approximately every 20 minutes. The vinyl acetate vapor was passed through the reaction mixture for a period of 3 hours, during which time the reaction mixture was maintained at a temperature just below its boiling point. The course of the reaction was followed by titrating the acetic acid in cuts taken from the distillate. The total acetic acid removed was 36.08 g. After the 3-hour entrainment period, the reaction mixture was held at reflux for ½ hour.

The reaction product was neutralized with a slurry of 0.8 g. of calcium hydroxide in 5 ml. of vinyl acetate. During the neutralization, the reaction product was continuously stirred for ½ hour and also heated to maintain the reaction product hot (about 60° C.). 3 g. of diatomaceous earth filter aid, marked by Johns-Manville under the tradename "Hyflo Super Cel" were added to the product and stirring continued for 2 minutes. The reaction product was filtered through a coarse, sintered glass Büchner funnel. The residue weighed 7 g. and contained 0.9 g. of the total mercury used in the original catalyst.

A small amount of hydroquinone was then added to the reaction product and the vinyl acetate solvent was removed by distillation using a short path distilling column. The mixture was warmed by means of an oil bath to 35–40° C. Vacuum was then applied to the reaction product and the pressure gradually lowered at such a rate that the low boiling components distilled off smoothly and rapidly. The heating and lowering of the pressure was continued until the residue was finally heated for approximately 10 minutes in an oil bath of 100–110° C. at 1 mm. pressure. The total time for the solvent removal was approximately 2 hours.

The crude divinyl sebacate was then purified by distilling in a short column distillation apparatus. The distillation was carried out by lowering the pressure to 1–2 mm. while maintaining the distillation temperature at 130° C. The final pot temperature at 1–2 mm. was 150° C. The divinyl sebacate, 70.5 g., iodine No. 193, acid No. 14.3, was over 97% pure, containing less than 3% acid and no detectable mercury. The conversion was 77% based on the starting sebacic acid.

The distillation residue weighed 16.5 g. and contained most of the mercury catalyst together with about 17% sebacic acid. With the addition of 10% fresh makeup mercuric acetate catalyst, a distillation residue obtained in the same manner was used for recycling in a subsequent run, carried out substantially in the same manner as above described, giving a conversion of over 80%.

Further purification of a part of the final divinyl sebacate (58 g.) was accomplished by placing it in a round bottom flask fitted with a stirrer and condenser along with 120 cc. of pentane. To the pentane solution, calcium hydroxide (3% of the weight of the crude ester) and water (1.5% of the weight of the crude ester) was added. This mixture was stirred for 1 hour at room temperature. The mixture was then filtered through a coarse, sintered glass Büchner funnel. The filter cake was washed with small portions of pentane. Most of the pentane was distilled off from the filtrate at atmospheric pressure at a pot temperature of 60° C. The remaining pentane was removed by gradually reducing the pressure. The divinyl sebacate was then subjected to a final distillation using a 16" Vigreaux column. The recovered pure divinyl sebacate had a boiling point of 136–137° C. at 2.5 mm. and iodine number of 198.6 and an acid number of 14–15. The yield based on the sebacic acid consumed was 90%. The conversion based on the starting sebacic acid was 77%.

EXAMPLE III

Vinyl benzoate 390 ml. (4.2 moles) of vinyl acetate were heated together with 2.8 g. of mercuric acetate. The mixture was stirred while adding 0.15 ml. of concentrated sulfuric acid one drop at a time. 85.4 g. (0.7 mole) of benzoic acid was then added to the reaction mixture and the reaction mixture pre-reacted to substantial equilibrium by refluxing the reaction mixture for 1½ hours. Vinyl acetate was then distilled from a separate still pot and the vinyl acetate vapor passed through the reaction mixture at such a rate that 500 ml. of distillate was collected every 20 minutes. The entrainment with the vinyl acetate vapor was continued for 3 hours while maintaining the reaction mixture at a temperature just below its boiling point. The reaction mixture was then again refluxed for ½ hour.

The reaction product was then neutralized by adding a slurry of 0.5 g. of calcium hydroxide in 5 ml. of vinyl acetate and filtered in the same manner as the reaction product was neutralized and filtered in Example 1. The reaction product was then distilled to remove the solvent and the remaining acetic acid. In distilling the solvents and acetic acid from the reaction product, the still temperature was maintained below 50° C. and a minimum pressure of 10 mm. was used. The total time for solvent stripping was 1 hour. The acetic acid in the distillate was calculated as 3.9 g. The crude vinyl benzoate weighed 101.3 g.

The vinyl benzoate was then readily separated from the impurities by distilling it under reduced pressure (5 mm.) through a short Vigreaux column. During the distillation, the still pot temperature at the beginning of the distillation was 80° C. and the final pot temperature 123° C. The distillate weighed 80 g. and was over 96% pure. The conversion to vinyl benzoate was 74.9 with a yield in excess of 90%.

The weight of the dark viscous residue was about 15.5 g. This residue contained most of the mercury and after adding 10% fresh makeup of mercuric acetate, the residue was recycled in another run giving a conversion of 79.3%. A second recycle again employing 10% makeup mercuric acetate gave 78.2% conversion.

EXAMPLE IV

Methyl vinyl succinate

Methyl vinyl succinate was prepared by placing 195 ml. (2.1 moles) of vinyl acetate in a reaction flask and heating with 2.8 g. of mercuric acetate. The mixture was stirred rapidly and 0.13 ml. of concentrated sulfuric acid was added to the mixture, one drop at a time, from a 1 ml. pipette. 92.4 g. (0.7 mole) of methyl acid succinate containing 195 ml. (2.1 moles) of vinyl acetate was then added to the reaction flask. The reaction mixture was refluxed gently for one hour. Vinyl acetate vapor was then distilled from a separate still pot as in the preceding examples and the vinyl acetate vapor passed through the reactants at such a rate that 500 ml. of distillate was collected at approximately every 20 minutes. The vinyl acetate vapor was passed through the reaction mixture until 8,500 ml. cuts were taken. The course of the reaction was followed by titrating the acetic acid in each cut. The vinyl acetate vapor was continuously passed through the reaction mixture. The reaction mixture was maintained at a temperature just below the lowest boiling component for over 3½ hours. The reaction mixture was then held at reflux for an additional ½ hour.

The reaction product was then neutralized by adding a slurry of 0.8 g. calcium hydroxide in 5 ml. of vinyl acetate and filtered, in the same manner as in the preceding examples. The dried product cake weighed 8 g.

A small amount of hydroquinone was then added to the reaction product and the reaction product distilled, using a short path distilling column. The reaction product was distilled by warming the mixture by means of an oil bath to 30–40° C. A vacuum was applied to the reaction product and the pressure gradually lowered at such a rate that the low boiling components distilled off smoothly and rapidly. The heating and lowering of the pressure was continued until the residue was finally heated for 10 minutes at an oil bath temperature of 76° C. and a pot temperature of 45° C. at 10 mm.

The crude methyl vinyl succinate was then transferred to a smaller distillation flask and distilled by lowering the pressure to 1.5 mm., using a 16" Vigreaux. At the beginning of the distillation, the initial pot temperature was 65° C. and the final pot temperature 100° C. The methyl vinyl succinate obtained weighed 81.2 g. The conversion based on the starting methyl acid succinate was 79% and the yield was 92%.

The weight of the distillation residue was 13 g. and was found to contain 11.82% Hg (75% of the Hg originally introduced as mercuric acetate) as well as 2 g. of crude methyl vinyl succinate and 6.7 g. of methyl acid succinate. The residue so obtained was suitable for direct recycling.

The methyl vinyl succinate when further purified by dissolving it in pentane and stirring with a small quantity of calcium hydroxide and water in the same manner as described in the process of Example II, and upon final distillation, gives pure methyl vinyl succinate, B.P. 86–88° C. at 10 mm., iodine No. 158–161, and acid No. 9.8.

EXAMPLE V

Vinyl cyclohexane carboxylate

Vinyl cyclohexane carboxylate was prepared by placing 390 ml. (4.2 moles) of vinyl acetate together with 2.8 g. of mercuric acetate in a reaction vessel and heating. The mixture was stirred rapidly and 0.13 of concentrated sulfuric acid was added to the mixture, one drop at a time. 89.8 g. (0.7 mole) of cyclohexane carboxylic acid were then added and the reaction mixture refluxed gently for one hour. Vinyl acetate vapor was distilled from a separate still pot as in the preceding example and the vinyl acetate vapor passed through the reactants at such a rate that 500 ml. of distillate was collected approximately every 20 minutes until no further carryover of acetic acid was apparent. The total acetic acid removed from the reaction was 39.4 g. The vinyl acetate vapor was passed through the reaction mixture while maintaining it at a temperature just below its boiling point for 3½ hours. The reaction mixture was then held at reflux for ½ hour.

The reaction product was then neutralized with calcium hydroxide and filtered in the same manner as in the preceding examples. The dried filter cake weighed 7 g. and contained 2.2% of the total mercury used in the original catalyst.

A small amount of hydroquinone was then added to the reaction product. The reaction product was then transferred to a short path distilling column and warmed to a temperature by means of an oil bath at 35–40° C. A vacuum was applied and the pressure gradually lowered at such a rate that the low boiling components distilled off smoothly and rapidly. The heating and lowering of the pressure was continued until the residue was finally heated for 10 minutes in an oil bath temperature of 75° C. and a pot temperature of 55° C. at 20 mm. The total time for distilling off the solvent was about two hours.

The crude vinyl cyclohexane carboxylate was then purified by distilling it in a 16″ Vigreaux distillation apparatus. The pressure was lowered to 10 mm. and the product heated. Distillation began at a pot temperature of 70° C. at 10 mm. and the final pot temperature was 100° C. at 10 mm. The vinyl cyclohexane carboxylate distillate weighed 78 g.

The distillation residue weighed 13 g. and, upon analysis, was found to contain 12.8% Hg (92% of the Hg originally introduced as mercuric acetate) as well as 32% crude vinyl cyclohexane carboxylate and 3.8% cyclohexane carboxylic acid. In a similar run, the residue obtained as above was recycled together with a makeup of 10% of mercuric acetate, giving a conversion of 81% and a yield of 95%.

A portion of the distillate was further purified by dissolving it in pentane and stirring with a small quantity of calcium hydroxide and water in the manner set forth in Example II. Upon final distillation, highly pure vinyl cyclohexane carboxylate was obtained, B.P. 69–71° C. at 10 mm. Hg; iodine No. 161.6; and, acid No., less than 1.

EXAMPLE VI

Methyl vinyl phthalate

Methyl vinyl phthalate was prepared by placing into a reaction vessel which had previously been dried by purging with nitrogen and heating, 195 ml. (2.1 moles) of vinyl acetate together with 2.8 g. of mercuric acetate. The mixture was stirred rapidly and 0.13 ml. of concentrated sulfuric acid was added to the mixture, one drop at a time from a 1 ml. pipette. 126 g. (0.7 mole) of methyl acid phthalate containing 195 ml. (2.1 moles) of vinyl acetate was then added to the reaction vessel. The reaction mixture was refluxed gently for one hour. Vinyl acetate vapor distilled from a separate still pot was passed through the reaction mixture at such a rate that 500 ml. of distillate was collected approximately every 20 minutes. The vinyl acetate was passed through the mixture until eight 500 ml. cuts were taken. The course of the action was followed by titrating the acetic acid in each cut. The total acetic acid removed was approximately 31 g. The entrainment of the acetic acid by the vinyl acetate vapor was continued at a temperature just below the boiling point of the reaction mixture for 3½ hours. The reaction mixture was then held at reflux for an additional ½ hour.

The reaction product was then neutralized with 0.8 g. calcium hydroxide and filtered in the same manner as the divinyl sebacate reaction product set forth in Example II. The dry filter cake weighed 12 g.

A small amount of hydroquinone was then added to the reaction product which was distilled, using a short path distilling column, to remove the solvents. The reaction product was distilled by warming it in an oil bath to 35–40° C. A vacuum was then applied to the reaction product and the pressure gradually lowered at such a rate that the low-boiling solvents distilled off smoothly and rapidly. The heating and lowering of the pressure was continued until the residue was finally heated for 10 minutes at an oil bath temperature of 100–110° C., and at a pot temperature of 90° C. at 1 mm. The total time for the solvent removal was approximately two hours. The crude product weighed 141 g.

The crude methyl vinyl phthalate was then transferred to a smaller distillation flask and the pressure lowered to 1 mm. while the product was being heated. At the beginning of the distillation, the pot temperature was 100° C. at 1 mm., and the final pot temperature at 1 mm. was 135° C. The methyl vinyl phthalate distillate obtained weighed 120 g. and was over 90% pure.

The weight of the distillation residue was 17.1 g. and was found to contain 8.69% Hg (81.4% of the Hg originally introduced as mercuric acetate), as well as 2.8 g. crude methyl vinyl phthalate and 5.3 g. methyl acid phthalate. The residue so obtained was suitable for direct recycling.

The methyl vinyl phthalate was further purified by dissolving it in pentane and benzene and stirring with a small quantity of calcium hydroxide in the same manner as described in the process of Example II. Upon final distillation, pure methyl vinyl phthalate, B.P. 103–106 at 1.5 mm., iodine No. 117.5–118 and acid No. 2.3–4.1, was obtained. The resulting yield was 83% and the conversion 72%.

It will be understood that the invention is not limited to the specific embodiments herein described but may be practiced in other ways without departing from the scope and spirit of the invention as defined in the following claims.

I claim:

1. The method of preparing vinyl ester products of carboxylic acids by a continuous process comprising reacting an organic carboxylic acid and a vinyl ester reactant in the presence of a mercury-strong acid-salt catalyst, neutralizing the catalyst acid with a neutralizing agent comprising an alkaline earth metal base to form an insoluble salt of the catalyst acid upon completion of the reaction, separating the salts so formed and residual neutralizing agent from the reaction product mixture, distilling the low boiling constituents, separating the carboxylic acid vinyl ester product and mercury containing residue from the remaining mixture, and repeating said reaction, using, as the vinyl interchange catalyst, the recovered mercury containing residue together with a corresponding amount of strong acid catalyst.

2. The method of preparing vinyl ester products of carboxylic acids comprising reacting a carboxylic acid and a vinyl ester reactant in the presence of a mercury-acid salt vinyl interchange catalyst, neutralizing the catalyst acid with a neutralizing agent comprising an alkaline earth metal base which is insoluble in the reaction product mixture and effective to form an insoluble salt of the catalyst acid, removing the resulting insoluble material including residual neutralizing agent from said reaction product mixture, separating the vinyl ester product and mercury containing residue from the remaining product, and repeating said reaction using, as the vinyl interchange catalyst, the recovered mercury containing residue together with a corresponding amount of strong acid catalyst.

3. The method according to claim 2 wherein said neutralization and removal of the resulting insoluble material is carried out at a temperature of about 60° C.

4. The method according to claim 3 wherein a finely divided diatomaceous earth is added to the reaction product after neutralization and the mixture then filtered to separate the insoluble substances therein.

5. The method according to claim 4 wherein the lower boiling constituents of the reaction product are then removed by distillation and the vinyl ester product and mercury catalyst obtained separately from the remaining mixture.

6. The method of preparing vinyl ester products of carboxylic acids comprising reacting an organic carboxylic acid and a vinyl ester reactant in the presence of a mercury strong acid salt vinyl interchange catalyst, neutralizing said catalyst acid with a neutralizing agent which is insoluble in the reaction product mixture, selected from the group consisting of the alkaline earth metal oxides, alkaline earth metal hydroxides and alkaline earth metal salts of weak acids, removing the resulting insoluble salts and residual neutralizing agent from said reaction product mixture separating the carboxylic acid vinyl ester product and the mercury containing residue from the remaining reaction product mixture, and repeating said reaction using, as the vinyl interchange catalyst, the recovered mercury containing residue together with a corresponding amount of strong acid catalyst.

7. The method according to claim 6 wherein said neutralizing agent is calcium oxide.

8. The method according to claim 7 wherein said neutralizing agent is calcium hydroxide.

9. The method according to claim 7 wherein said neutralizing agent is barium oxide.

10. The method according to claim 7 wherein said neutralizing agent is barium hydroxide.

11. The method of preparing vinyl stearate comprising reacting stearic acid and vinyl acetate in the presence of a mercury-strong acid salt vinyl interchange catalyst, neutralizing said catalyst acid with calcium hydroxide, removing the resulting insoluble salts and residual calcium hydroxide from said reaction product mixture, separating the vinyl stearate product and the mercury-containing residue from the remaining reaction product mixture, separating said vinyl stearate product from said mercury-containing residue, said separation steps being carried out at temperatures below substantially about 140° C., and repeating said reaction using as the vinyl interchange catalyst the recovered mercury-containing residue together with an amount of said strong acid catalyst corresponding substantially to the proportion thereof used in said first reaction.

References Cited in the file of this patent

UNITED STATES PATENTS

| | | |
|---|---|---|
| 1,185,499 | Grunstein | May 30, 1916 |
| 1,433,308 | Steffens | Oct. 24, 1922 |
| 2,177,473 | Brant | Oct. 24, 1939 |
| 2,299,862 | Toussaint et al. | Oct. 27, 1942 |
| 2,586,860 | Port et al. | Feb. 26, 1952 |
| 2,642,389 | Cohen et al. | June 16, 1953 |
| 2,715,140 | Vining | Aug. 9, 1955 |

FOREIGN PATENTS

| | | |
|---|---|---|
| 309,888 | Great Britain | Apr. 17, 1929 |
| 686,050 | Great Britain | Jan. 14, 1953 |

OTHER REFERENCES

Groggins: Unit Processes in Organic Synthesis, 4th ed., 1952, page 620.